United States Patent

[11] 3,589,404

[72] Inventor Lloyd Spencer
220 Patrician Way, Pasadena, Calif. 91105
[21] Appl. No. 814,990
[22] Filed Apr. 10, 1969
[45] Patented June 29, 1971
Continuation-in-part of application Ser. No. 491,771, Sept. 30, 1965, now abandoned, which is a continuation-in-part of application Ser. No. 359,392, Apr. 13, 1964, now abandoned.

[54] MIXING VALVE AND REPLACEABLE VALVE CARTRIDGE THEREFOR
21 Claims, 25 Drawing Figs.
[52] U.S. Cl. .................................................. 137/119,
137/454.6, 137/625.4, 137/636.3, 251/172
[51] Int. Cl. .......................................................... F16k 11/04
[50] Field of Search ............................................ 137/454.2,
454.6, 636.4, 607, 636.3, 625.41, 636.1, 636.2, 119

[56] References Cited
UNITED STATES PATENTS
2,792,847 5/1957 Spencer ....................... 137/636.2
3,395,733 8/1968 Spencer ....................... 137/636.2
3,395,734 8/1968 Spencer ....................... 137/637

Primary Examiner—Harold W. Weakley

ABSTRACT: A mixing valve having two parallel valve assemblies including valve inlet seals, valve elements engageable with the inlet seals, sealing diaphragms and one or more common outlet ports all incorporated in a single replaceable valve cartridge secured between a base and a journal ball or journal socket; the assemblies further including cam followers extending through the journal ball or protruding into the journal socket; either the journal socket or ball cooperating with a complementary member having cam areas movable across said cam followers to effect operation of either valve assembly or both assemblies in concert or in opposition.

The mixing valve and replaceable valve cartridge also including modifications wherein the axes of the valve assemblies are angularly related preferably at 120° to improve operation of the control handle and to provide space in the removable valve cartridge for a diverter valve, and the axes of each valve assembly and cam follower are radially offset to minimize the dimensions of the mixing valve.

PATENTED JUN29 1971
3,589,404
SHEET 1 OF 4
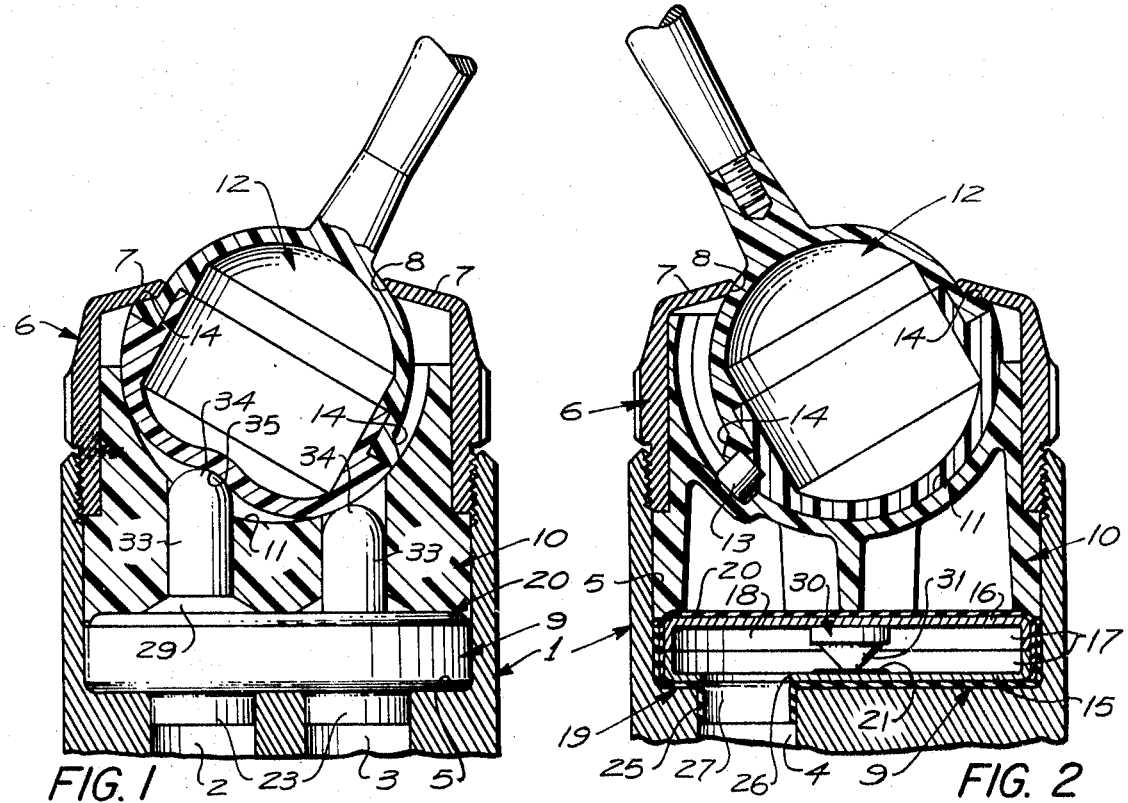
FIG. 1
FIG. 2
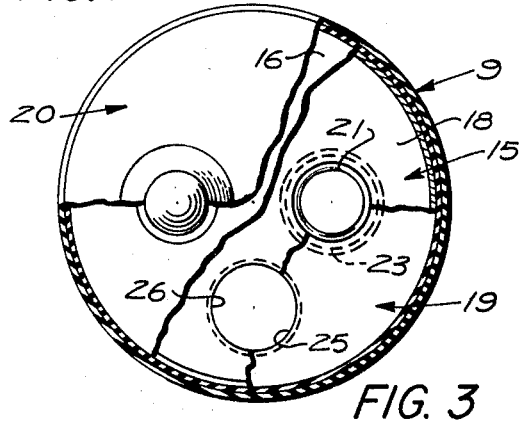
FIG. 3
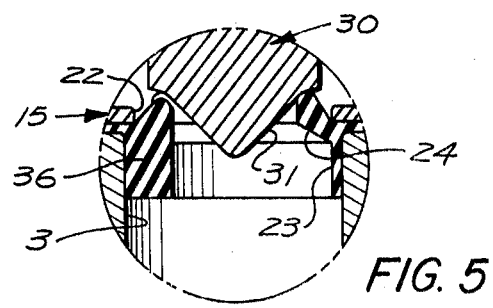
FIG. 5
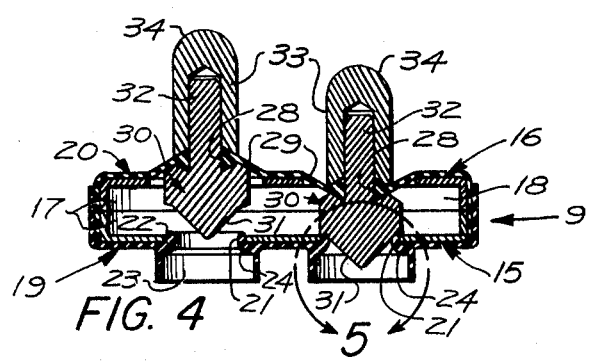
FIG. 4
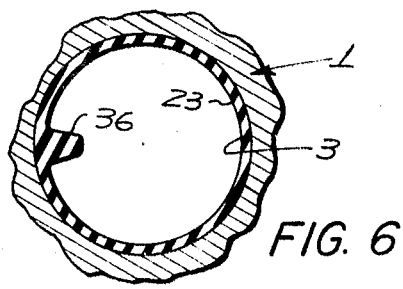
FIG. 6
INVENTOR.
Lloyd Spencer

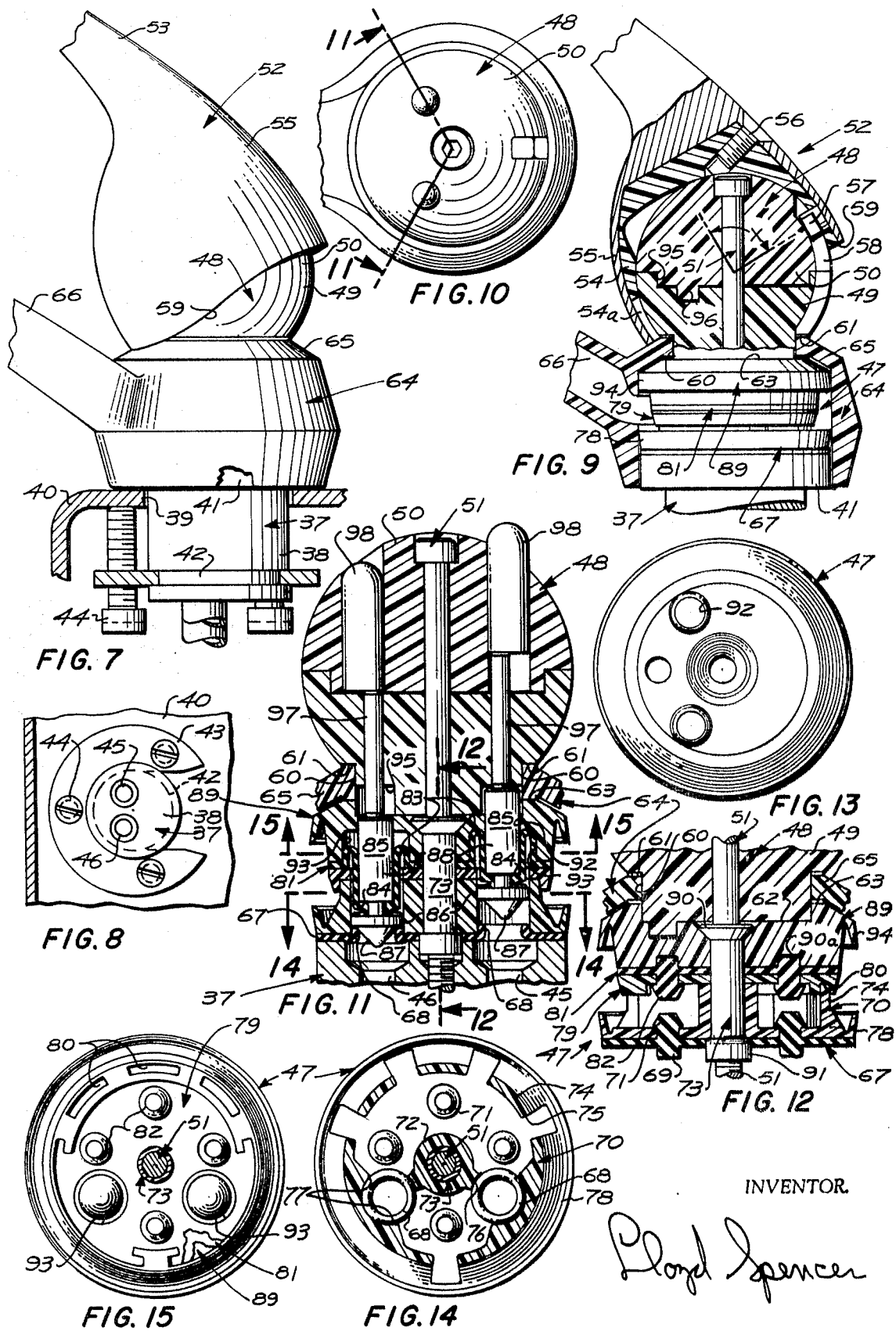

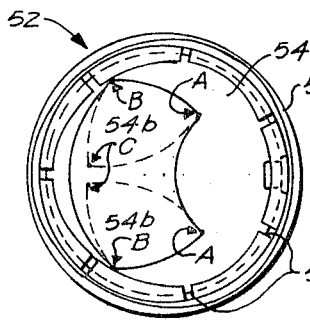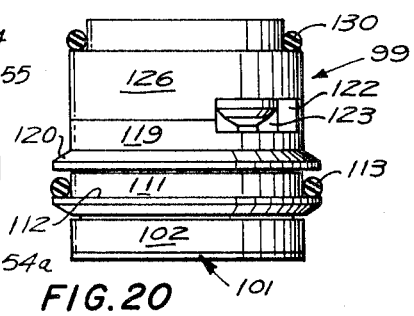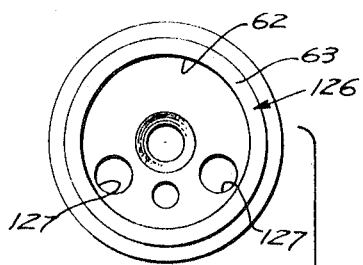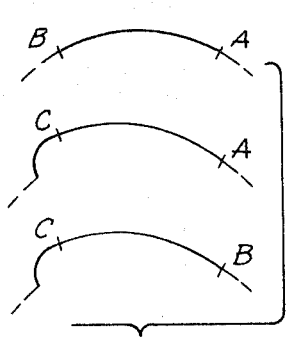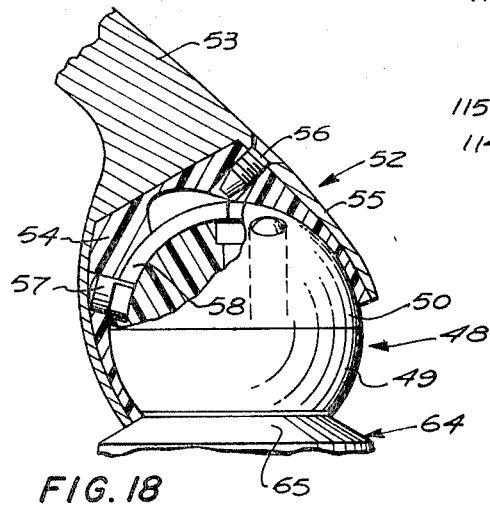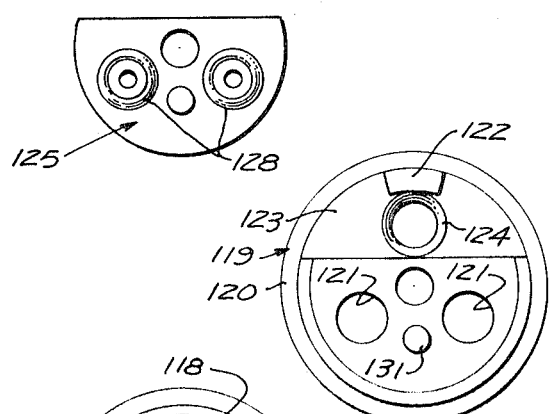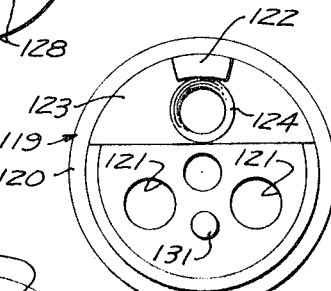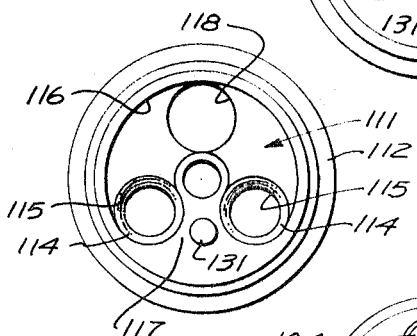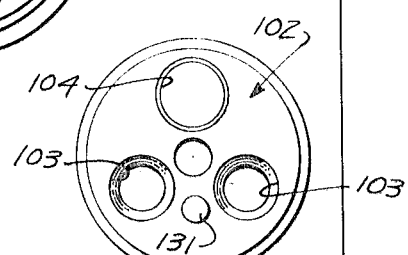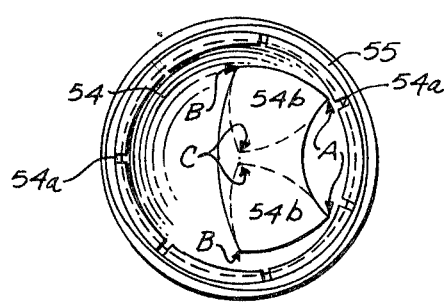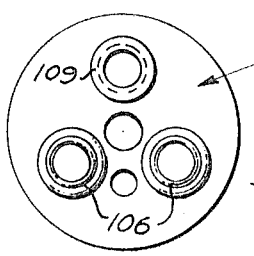

INVENTOR.
Lloyd Spencer

MIXING VALVE AND REPLACEABLE VALVE CARTRIDGE THEREFOR

BACKGROUND OF THE INVENTION

This application is a continuation-in-part of my previous application, Ser. No. 491,771, filed Sept. 30, 1965 for REPLACEABLE VALVE UNIT; now abandoned, which, in turn is a continuation-in-part of my previous applications, Ser. No. 359,392, filed Apr. 13, 1964, for MIXING VALVE, now abandoned.

Also, the present application is related to the copending application, Ser. No. 814,991, filed Apr. 10, 1969 for ACTUATOR FOR MIXING VALVES.

SUMMARY OF THE INVENTION

This invention is summarized in the following objects:

First, to provide a mixing valve for hot and cold water which incorporates a novelly arranged replaceable valve cartridge which contains the valve armatures and valve seats of both the hot and cold water and forms the mixing chamber therefor, the valve unit being sealingly mounted in the valve body in such a manner that except for an outlet to a discharge spout, the water is confined to the interior of the replaceable valve cartridge.

Second, to provide a replaceable valve cartridge of this type in which the valve seats are movable against water pressure during the final closing movement of the valve armature, and wherein each valve armature when released is forced open by water pressure and offers minimal resistance so that the mixing valve operates under conditions of minimal water pressure.

Third, to provide in a replaceable valve cartridge a valve seat which does not close on first contact by the valve armature but requires a predetermined axial closing movement before full closure is effected; thereby to minimize transient pressure surges incidental to sudden closure.

Fourth, to provide a hot and cold water mixing valve and dual valve unit therefor, wherein the valve assemblies are mounted in a valve body connected by a neck joined to a journal ball and are operated by cam followers extending through said journal ball on which is mounted a socket structure having cam areas movable across the cam followers, the axes of the cam followers being radially outwardly offset with respect to the axes of the valve assemblies to minimize the area occupied by the connecting neck, thereby minimizing the size of the mixing valve.

Fifth, to provide a hot and cold water mixing valve and a dual valve unit therefor, wherein the valve assemblies are arranged at less than 180° displacement from a common center thereby to increase, without increasing the overall size, the space available for auxiliary mechanism such as diverter valves.

Sixth, to provide a hot and cold water mixing valve and replaceable dual valve cartridge therefor which is secured in place by a single screw extending through the valve unit and opposed clamping and sealing elements forming parts of the mixing valve.

DESCRIPTION OF THE FIGURES

FIG. 1 is an enlarged fragmentary sectional view of one form of mixing valve such as shown in U.S. Pat. Nos. 2,792,847 and 3,384,121, showing in elevation one embodiment of the replaceable valve cartridge.

FIG. 2 is another enlarged fragmentary sectional view thereof, taken at right angles to FIG. 1 and showing the replaceable valve cartridge in section.

FIG. 3 is an enlarged, partial plan, partial sectional view of the replaceable valve cartridge.

FIG. 4 is a sectional view, taken through 4—4 of FIG. 3.

FIG. 5 is a further enlarged sectional view, corresponding to the region within circle 5 of FIG. 4, but showing a modified form of valve seat.

FIG. 6 is a fragmentary bottom view of the replaceable valve cartridge, showing the modified valve seat.

FIG. 7 is a fragmentary side view of a modified mixing valve.

FIG. 8 is a reduced bottom view thereof, showing the means for mounting the mixing valve on a sink ledge, the ledge being shown fragmentarily.

FIG. 9 is a sectional view, taken from the same aspect as FIG. 7, showing a modified replaceable valve cartridge and other elements in elevation.

FIG. 10 is a fragmentary plan view thereof, with the control handle structure removed.

FIG. 11 is an enlarged fragmentary sectional view thereof, taken through 11—11 of FIG. 10.

FIG. 12 is an enlarged fragmentary sectional view thereof, taken through 12—12 of FIG. 11.

FIG. 13 is an enlarged top view of the modified replaceable valve cartridge.

FIG. 14 is a transverse sectional view, taken from 14—14 of FIG. 11 with the valve members removed, showing the bottom side of the mixing chamber and the valve seats.

FIG. 15 is a transverse sectional view, taken from 15—15 of FIG. 11, showing the top side of the mixing chamber.

FIG. 16 is a bottom view of the socket structure.

FIG. 17 is a diagrammatical view indicating the contours of the cam areas.

FIG. 18 is a fragmentary sectional view, corresponding to FIG. 9, showing a modified socket structure and corresponding modified location of the axes of the valve assemblies.

FIG. 19 is a bottom view of the modified socket structure.

FIG. 20 is a side view of a further modified replaceable valve cartridge.

FIG. 21 is an exploded view thereof, with each of the parts shown in plan.

Figures 22, 23:
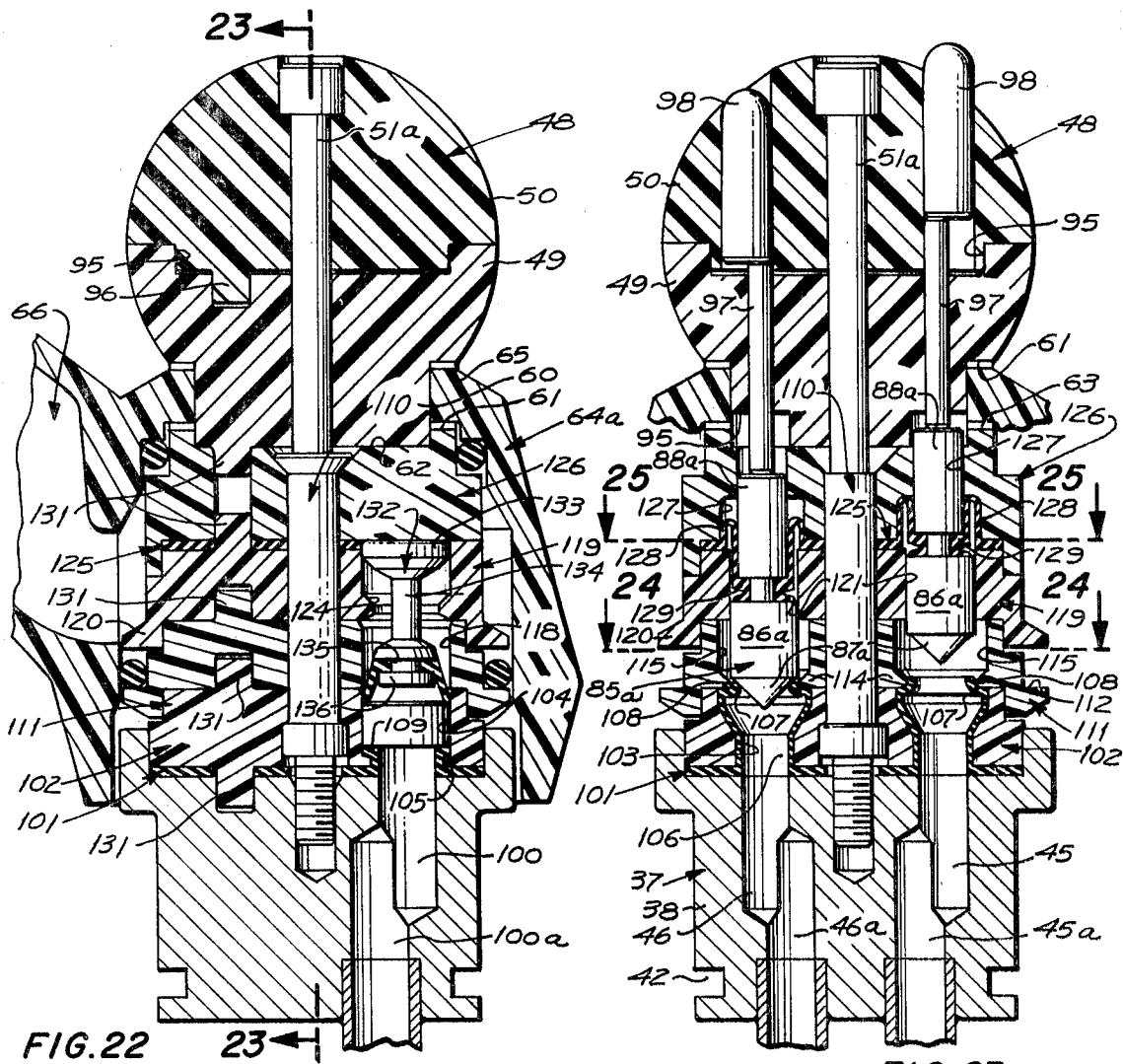
FIG. 22 is a fragmentary enlarged longitudinal sectional view, showing a mixing valve modified to receive the replacement cartridge illustrated in FIGS. 20 and 21, with the control handle structure omitted.
FIG. 23 is a fragmentary enlarged longitudinal sectional view thereof, taken through 23—23 of FIG. 22.
Figure 24:
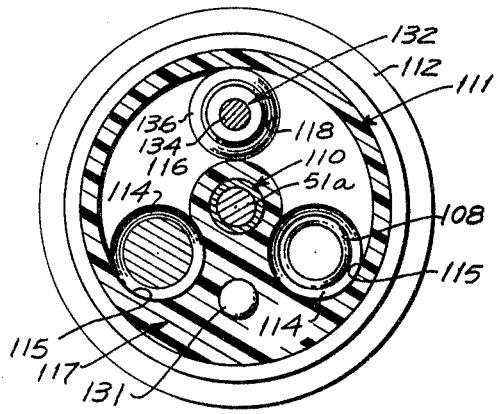
FIG. 24 is a transverse sectional view of the further modified replaceable valve cartridge, taken through 24—24 of FIG. 23.
Figure 25:
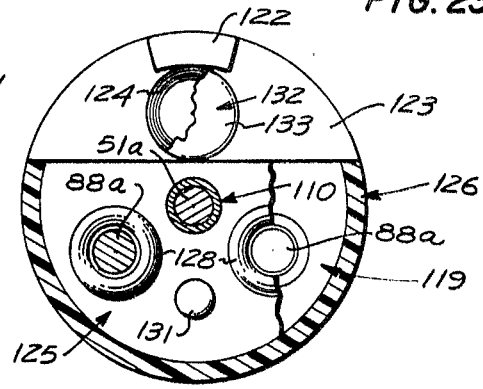
FIG. 25 is another transverse sectional view, taken through 25—25 of FIG. 23.

Reference is first directed to FIGS. 1 through 6. The construction here illustrated includes a valve body 1, shown fragmentarily in FIGS. 1 and 2, and having an axially directed pair of inlets 2 and 3 for hot and cold water, and a common outlet 4 for mixed water, all intersecting the base end of a cylindrical socket 5.

The outer portion of the socket 5 is internally screw-threaded to receive a retainer ring 6, having an inturned flange 7, forming a journal opening 8. The base portion of the socket 5 receives a replaceable valve unit or cartridge 9 in the form of a flat cylinder clamped in place by a retainer member 10, engaged by the retainer ring 6.

The retainer member 10 is provided with an outwardly facing journal socket 11 of spherical contour. Journaled between the socket 11 and the margins of the opening 8 is a cam ball 12, similar to the cam ball shown in my previous U.S. Pat. No. 3,384,121. As more fully disclosed in this patent, the cam ball 12 and its socket 11 are provided with a key and slot means 13 to limit movement to two axes; that is, rotation about the axis of the handle is prevented.

Also, as shown more fully in the aforementioned patent, a three lobe cam shoulder 14 which engages the flange 7, confines movement of the cam ball to an essentially triangular configuration.

The replaceable valve cartridge 9 is provided with a pair of discs 15 and 16, having complementary abutting flanges 17 to form a valve chamber 18. The discs are encased by a pair of gaskets 19 and 20. The bottom gasket is provided with a pair of yieldable valve seats 21, aligned with the pair of inlets 2 and 3. The valve seats project upwardly through openings 22 in the disc 15. The gasket is also provided with a pair of seal skirts 23 which project into the inlets 2 and 3. The flanges are coaxial with and larger than the valve seats 21 so as to provide axially deformable shoulders 24.

The gasket 19 is also provided with a third seal skirt 25, fitting the outlet 4 and aligning with a mating opening 26 in the disc 15 and its gasket 19.

The disc 16 is provided with openings 27 which align with the valve seat openings 22. The gasket 20 is provided with a pair of apertures 28, having enlarged margins and disposed in axial alignment with the valve seats 21. The apertures 28 are surrounded by diaphragms 29 of normally conical shape which fit the openings 27.

Fitted between each seat 21 and the corresponding aperture 28 is a valve member 30, having a conical end 31 which engages the seat 21. Each valve member is provided with a stem 32 which extends through the corresponding aperture 28 and receives a stem cap 33, the extremity of which is spherically curved to form a cam follower tip 34. The margins of each aperture are clamped and sealed by the corresponding valve member 30 and stem cap 33.

The cam followers engage cam areas 35 on the cam ball 12 which are essentially triangular corresponding to the permitted movement of the cam ball. As more fully disclosed in the aforementioned U.S. Pat. No. 3,384,121, the cam areas are contoured to cause individual movement, concerted movement or opposed movement of the cam followers so as to effect corresponding movement of the valve members relative to their valve seats.

By reason of the yieldable shoulders 24, the valve seats are axially depressed during final closing movement of the valve member so that the valve seat is actually held in its closed condition by the force of the water acting on the shoulder 24. As a result, the force against the valve seat is not sufficient to damage the seat even if a particle should lodge therein. In such a case, subsequent opening of the valve washes the particle free. Also, the axial travel of the valve seat compensates for tolerance variations between the cam followers 34 and the valve seat engaging region of the valve member 30.

In some installations, it is desirable to enlarge the opening 22 in the disc 19 to permit limited upward flexure of the valve seat 21 in response to upstream water pressure as the valve member 30 approaches the valve seat, as shown in FIG. 5. If this limited flexure is permitted, it is desirable to provide an axial rib 36 upstream of the valve seat so that, initially, complete closure does not occur, thus avoiding a pressure surge which might produce a water banner. Sufficient travel of the valve member after first contact is provided to ensure complete closure. A similar effect is attained if the valve seat is disposed at a slight angle so that one side is engaged first and contact progresses to the opposite side.

It will be observed that the water is confined to the interior of the cartridge 9; also, when the cartridge is in place, at least the margins of the gaskets 19 and 20 are engaged to form seals. To replace the cartridge 9, it is merely necessary to unscrew the retainer ring 6. Also, it will be noted that the diaphragms 29 form effective seals so that the control cam and adjacent parts are outside the water path.

Reference is now directed to FIGS. 7 through 19. The mixing valve here illustrated is particularly adapted for control by the actuator shown in the copending application, Ser. No. 814,991, filed Apr. 10, 1969.

A base member 37 is provided, having a depending portion 38 dimensioned to extend through an aperture 39 provided in the margin of a sink 40. The base member is provided with a flanged upper end 41 which rests on the margins of the aperture 39. Near its lower extremity, the depending portion is provided with an annular groove 42, which receives a C-shaped retainer 43, equipped with screws 44 which bear against the underside of the sink margin to clamp the base member 37 in place. The base member is provided with a cold water passage 45 and hot water passage 46 located at approximately 120° with respect to the axis of the base member.

Mounted on the base member 37, designated 47, is a modified form of the replaceable valve unit or cartridge 9, which will be later described in detail. Mounted on the cartridge 47 is a journal ball 48, which includes a bottom component 49 and a top component 50. A single bolt 51 extends downwardly through the journal ball 48 and replaceable valve cartridge 47 and screw threads into the base member 37. Retained on the journal ball 48 is a socket structure 52, which is provided with a control handle 53, shown fragmentarily.

As more fully disclosed in the copending application, Ser. No. 814,991, filed Apr. 10, 1969, the socket structure 52 includes an inner socket member 54 of greater than hemispherical extent, the periphery of which is provided with slits 54a so that the inner socket member may be forced over the journal ball 48. The inner socket member is retained on the journal ball by an outer socket member 55 which prevents the margin of the inner socket from spreading. A single screw 56 secures the socket members together.

The inner socket member is provided with a pair of cams 54b, of essentially triangular shape, each having pieces A, B and C. The cams are engaged by cam followers which control valve assemblies within the replaceable cartridge 47 as will be later described. Between A and B, each cam has zero slope; that is, it is concentric with the center of the journal ball, as indicated diagrammatically in FIG. 17. Between B and C, as well as between A and C, the cam slopes or curves radially outward toward C. Intermediate portions of the cams vary in depth proportionally. Also, the inner socket member 54 is provided with a key 57, and the journal ball 48 is provided with a key slot 58 to confine the socket structure to two axes of movement. Still further, the margin of the socket structure 52 forms a three lobe stop cam 59.

The lower end of the bottom component 49 of the journal ball 48 is provided with a constricted cylindrical portion 60, forming a shoulder 61 with the spherical portion of the bottom component. The upper end of the replaceable valve cartridge 47 is provided with a shallow recess 62 which receives the lower extremity of the cylindrical portion 60 and, surrounding the recess, forms a shoulder 63, confronting the shoulder 61.

The replaceable valve cartridge 47 and the upper end of the base member 37 is enclosed in a hub structure 64, having an internal flange 65 fitting between the shoulders 61 and 63. The flange 65 may be clamped between the shoulders 61 and 63 or may by permitted to rotate therebetween. The upper side of the flange 65 forms a stop shoulder which is engaged by the three lobe stop cam 58 to confine the movement of the socket structure to the limits of the cams. A discharge spout 66, shown fragmentarily, extends from the hub structure.

The replaceable valve cartridge 47 includes a circular bottom gasket 67 formed of an elastomer and provided with a pair of upwardly facing valve seats 68 displaced 120° with respect to the axis of the gasket to align respectively with the hot and cold water passages 45 and 46. The upper ends of the passages are enlarged so as to expose a ring of the gasket surrounding each valve seat to upstream water pressure. The bottom gasket is provided with basses 69 which fit into mating recesses to orient the bottom gasket with respect to the base member 37 as well as a central opening to receive the bolt 51.

Received on top of the bottom gasket 67 is a bottom valve guide disc 70, having perforations which receive flanged retaining lugs 71 projecting upwardly from the bottom gasket in order to secure and orient the disc 70 with respect to the bottom gasket. The valve guide disc is provided with a central boss 72 which receives a tie sleeve 73 which receives the bolt 51. Near its outer periphery, the disc is provided with a rim 74 having slots 75. Relatively displaced 120° with respect to the axis of the disc and disposed between the boss 72 and rim 74 is a pair of apertures which receive the valve seats 68. The apertures are smaller than the upper ends of the passages 45 and 46 and their margins serve to limit upward displacement of the valve seats in response to upstream water pressure.

The boss 72 and rim 74 are provided with opposed and spaced valve guide ribs 76 and 77, forming confronting faces extending upwardly from the valve seat apertures and defining guide cylinders. Outwardly from the rim 74, the disc 70 is provided with a circular, upwardly extending, seal lip 78. The valve guide disc 70 is preferably injection molded from a plastic material having sufficient elastomeric properties that the relatively thin lip 78 sealingly engages the confronting inner wall of the hub structure, as indicated in FIG. 9.

Fitted on the bottom valve guide disc 70 is an intermediate disc 79, having a ring of shallow recesses 80 to receive the upper portions of the rim 74 disposed between the slots 75. The disc 79 is provided with a central aperture to receive the tie sleeve 73 and clearance apertures aligned with the valve seats 68.

Fitted on the intermediate disc 79 is an upper gasket 81, having flanged retainer bosses 82 received in mating openings in the disc 79 and a central aperture to receive the tie sleeve 73. The upper gasket is also provided with a pair of rolling diaphragms 83, terminating in integral restricted seal rings 84.

A pair of valve members 85 is provided. Each valve member includes a head 86, guided between a corresponding pair of ribs 76 and 77 and having a conical seal face 87 engageable with a corresponding valve seat 68. A stem 88 extends upwardly from the head 86 and is provided adjacent the head with a groove which receives a seal ring 84.

Fitted on the upper gasket 81 is an upper disc 89, having depressions to receive positioning bosses 90a projecting upwardly from the upper gasket 81. The upper disc forms the upper end of the replaceable cartridge 47 and is provided with the recess 62 and shoulder 63. Also, the upper disc is provided with a central opening which receives the upper end of the tie sleeve 73. The tie sleeve is a hollow rivet with expanded ends 90 and 91, which serve to clamp the discs 70, 79 and 89 as well as the upper gasket 81 together. The upper disc is provided with valve stem guide apertures 92, the lower ends of which are enlarged, as indicated by 93, to receive the rolling diaphragms 83. At its periphery, the upper disc 89 is provided with a downwardly directed flexible seal lip 94.

The confronting sides of the bottom disc 70 and intermediate disc 79 between the central boss 72 and rim 74 define a primary mixing chamber from which water discharges through the slots 75. The opposed flexible seal lips 78 and 94 and the intervening walls of the replaceable cartridge and hub structure 64 define a secondary mixing chamber communicating with the discharge spout 66.

The recess 62 in the upper side of the upper disc 89 is provided with a depression which receives an orientation boss extending from the lower end of the bottom component 49 of the journal ball 48. The upper side of the bottom component is recessed and provided in its recess with a depression which receives respectively a cylindrical extension 95 and orientation boss 96, provided at the underside of the top component 50 of the journal ball 48.

The upper ends of the valve stems, which are displaced 120° with respect to the axis of the replaceable cartridge, are received in clearance recesses 95 provided in the bottom component 49 of the journal ball 48. The stem axes also align with small bores extending through the bottom component which receive push pins 97. The top component 50 of the journal ball 48 is provided with bores of larger diameter than the push pin bores which receive cam followers 98 in the form of rods having hemispherical tips to be engaged by the cams 54b provided in the inner socket member 54.

It will be noted that, by reason of the valve assemblies displaced to 120°, or approximately so, rather than 180° that the locations of the cam areas 54b with respect to the key 57 is improved. More particularly, by setting of the axes forward; that is, to the left as viewed in FIGS. 7, 9, 10 and 16, the key 57 and slot 58 may be located at the backside of a sink mounted mixing valve where the slot 58 is not visible and yet provides nearly an optimum 90° relation between a radial plane through the center points of the cam areas and a radial line through the axis of the key 57, as indicated by X in FIG. 9. If the valve be wall mounted, which would expose the slot 58 at the upper side of the valve, or for other reason the slot need be concealed, the valve assemblies may be offset rearwardly or to the right, as indicated in FIGS. 18 and 19, permitting the slot 58 to be confined within the socket structures for all positions of the mixing valve.

Reference is now directed to FIGS. 20 through 25. This construction differs from the preceding mixing valve principally in the use of a replaceable cartridge 99, which incorporates a diverter valve in addition to the hot and cold water valve assemblies.

As in the preceding mixing valve, the further modified mixing valve includes a base member 37 which differs in the addition of a diverter passage 100. The cold water passage 45, hot water passage 46 and the diverter passages are 120° related with respect to the axis of the base member. In order to minimize the diameter of the depending portion 38, the passages 45, 46 and 100 intersect respectively radially inwardly offset passages 45a, 46a and 100a, as shown in FIGS. 22 and 23.

The mixing valve shown in FIGS. 22 and 23 utilizes the journal ball 48 and the central bolt 51. The replaceable cartridge 99 is encased in a hub structure 64a, similar to the hub structure 64, and including the inwardly extending flange 65, and a discharge spout 66.

The replaceable valve cartridge 99 includes a bottom gasket 101 on which is mounted a bottom or valve seat disc 102. The disc 102 is provided with hot and cold water ports 103 which are expanded at their upper ends and a diverter valve receiving cylinder 104, having an inturned flange 105 at its lower end. The bottom gasket 101 is provided with upwardly directed sleeves 106 which line the ports 103 and are provided at their upper ends with yieldable radially inwardly extending flanges or shoulders 107 and upwardly directed valve seats 108. The bottom gasket 101 is also provided with a flanged boss 109 received in the cylinder 104 and retained by the flange 105.

As in the construction shown in FIGS. 7 through 19, the axes of the hot and cold water ports 103, sleeves 107 and valve seats 108 are displaced from each other 120° with respect to the central axis of the bottom gasket and inlet port disc 102. The axis of the cylinder 104 is displaced 120° from the two ports 103 and related parts.

The bottom disc 102 is provided with a central bore which receives the lower end of a tie sleeve 110, similar to the tie sleeve 73. A valve chamber disc 111 is provided, having a central bore which receives the tie sleeve. The upper periphery of the disc 102 is reduced slightly, and the disc 111 axially overlaps the reduced periphery, and is provided with an external flange 112 to receive an O-ring 113. Or, the disc may be provided with a seal lip similar to the seal lip 78.

The valve chamber disc 111 is provided with a pair of apertures, the margins of which form inturned flanges 114 dimensioned to receive the valve seats 108 and restrain the shoulders 107 against upward displacement. The flanges 114 join to semicylindrical walls 115 of larger diameter but concentric therewith which form the extremities of a C-shaped mixing valve chamber 116, which encircles the center of the disc 111 and leaving between the end walls a radial web 117 extending from the center of the disc 111. The bottom of the chamber 116, at a point 120° from the axis of each flange 114 is intersected by an aperture 118 aligned with the diverter valve cylinder 104.

The valve chamber disc 111 is covered with a lower valve guide disc 119, the periphery of which fits over a reduced upper end of the disc 111 and is provided with an external flange 120 confronting the flange 112. The disc 119 is also provided with a pair of valve guide bores 121 aligned with the axes of the flanges 114 and the valve seats 108 retained therein.

One side of the disc 119 is reduced in axial dimension except for a post 122 and forms an outlet chamber 123, having outlets on either side of the post. The bottom of the outlet chamber is provided with an aperture in axial alignment with the aperture 118 forming, at its upper side, a diverter valve seat 124 and providing an outlet from the mixing valve chamber 116. The disc 119 is provided with a central bore which receives the tie sleeve 110.

Overlying the lower valve guide disc 119 except for the portion occupied by the outlet chamber 123, is a diaphragm gasket 125 which is clamped against the disc 119 by an upper valve guide disc 126 covering the outlet chamber 123. The disc 126 is provided with a central bore and the diaphragm gasket is perforated to receive the tie sleeve 110. The disc 126 is provided with a pair of valve stem guide bores 127 aligned with the valve guide bores 121.

The gasket 125 is provided with a pair of rolling diaphragms 128 which are received in counterbored lower portions of the guide bores 127. The rolling diaphragms are intended to fold and terminate in sealing rings 129 of reduced diameter.

The upper portion of the upper valve guide disc 126 is reduced in diameter to provide a ledge dimensioned to receive an O-ring 130; or, the upper periphery of the disc 126 may be provided with an integral seal lip similar to the seal lip 94. The upper surface of the disc 126 is provided with a shallow recess 62 to receive the constricted cylindrical portion 60 of the bottom component 49 of the journal ball 48, and is surrounded by the shoulder 63, as in the construction shown in FIGS. 7 through 19.

The tie sleeve 110 is enlarged at its extremities to clamp the discs 102, 111, 119 and 126 as well as the diaphragm gasket 125 in the manner of the tie sleeve 73. Also, the replaceable cartridge 99 is secured in place by a tie bolt 51a, similar to the bolt 51, except for length.

In order to orient the discs 102, 111, 119 and 126 with respect to the base member 37 and the journal ball 48, the discs are provided with an axially aligned set of bosses 131 and mating sockets or bores.

The replaceable cartridge is provided with a pair of valve members 85a corresponding to the valve members 85 of the previously described embodiment. Each valve member 85a includes an elongated head 86a, guided in a bore 121 and having a conical seal face 87a. A stem 88a extends upwardly from the head 86a into the corresponding upper or valve stem guide bore 121, and is provided with a groove adjacent the head 86a to receive a sealing ring 129. The upper ends of the stems 88a are engaged by the push pins 97.

Received in the cylinder 104 and extending through the seat 124 is a diverter valve 132. The diverter valve includes a head 133 located above the seat 124 and engageable therewith. A stem 134 depends from the head 133 and its lower end is provided with a grooved flange 135, which receives the constricted upper end of a seal cup 136, having a seal lip extending into the cylinder 104.

Operation of the hot and cold water valves of the embodiment shown in FIGS. 20 through 25 is the same as the preceding structure shown in FIGS. 7 through 19, except that the water from the mixing chamber 116 flows through the diverter valve seat 124 and outlet chamber 123 into a secondary mixing chamber between the O-rings 113 and 130, the replaceable cartridge 99 and the hub structure 64a, and as in the previously described embodiment, discharge through the spout 66.

The diverter valve 132 functions in a conventional manner. The diverter passage 100 is connected to a conventional spray device (not shown) having a normally closed control valve. When this valve is closed, back pressure below the seal cup 136 and the pressure differential across the diverter valve head 133 is sufficient to hold the diverter valve open for discharge of water from the spout 66. When the valve in the spray device is open, the drop in pressure at the passage 100 is sufficient to close the valve head 133 against its seat 124 and water flows around the cup 136.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:
1. A mixing valve, comprising:
 a. a base member having a hot water inlet and a cold water inlet intersecting its upper side and defining parallel axes;
 b. a mixing valve cartridge mounted on said base member and having a hot water valve assembly and a cold water valve assembly in axial alignment with corresponding inlets, and a laterally directed outlet;
 c. a journal ball mounted on said cartridge and defining at its juncture therewith a neck of reduced diameter;
 d. a valve control means including a socket journaled on said ball and having a pair of cam areas confronting said ball, and a peripheral stop cam facing the cartridge;
 e. operating means extending from said valve assemblies through said journal ball and terminating in a cam follower element for each valve engageable with a corresponding cam area;
 f. and a spout structure including a hub fitting over said cartridge between said journal ball and base member, an internal flange received in said neck, an annular stop shoulder confronting said stop cam for cooperation therewith to limit movement of said valve control means, and a laterally directed spout for the discharge of water from said outlet.

2. A mixing valve, as defined in claim 1, wherein:
 a. said journal ball, cartridge and base member share a common axis and said inlets, valve assemblies and operating means define axes disposed in planes circumferentially displaced approximately 120° with respect to said common axis.

3. A mixing valve, as defined in claim 2, wherein:
 a. the axes of said cam follower elements are offset radially outward from the axes of said valve assemblies.

4. A mixing valve, as defined in claim 1, wherein:
 a. said base member also includes an outlet passage;
 b. and said cartridge includes a second outlet communicating with said outlet passage, and a diverter valve operable to direct water to said lateral outlet or to said second outlet.

5. A mixing valve and replaceable cartridge therefor, comprising:
 a. a base member having a pair of spaced inlet passages;
 b. a replaceable mixing valve cartridge sealingly mounted on said base member and including a hot water valve assembly and a cold water valve assembly aligned with said passages, an outlet, a mixing chamber connecting said valve assemblies with said outlet, and a central tube sealed from the interior of said cartridge;
 c. a valve control means including a journal member mounted on said cartridge, and means extending through said journal means for operating said valve assemblies alternately or in unison;
 d. and a single central securing means joining said journal member, cartridge and base member.

6. A mixing valve and replaceable cartridge therefor, as defined in claim 5, wherein:
 a. said valve assemblies are located on axes defining planes through the axis of said securing means and relatively displaced approximately 120°.

7. A mixing valve and replaceable cartridge therefor, as defined in claim 6, wherein:
 a. said cartridge is provided with a first and a second outlet;
 b. and a diverter valve is interposed between said outlets.

8. A replaceable valve cartridge for a mixing valve structure having a cavity formed between the inner and outer walls, the inner wall being intersected by a pair of inlet ports, the outer wall being intersected by a pair of valve bores opposite said inlet ports, said mixing valve also including a control operable along the axes of said bores and having an outlet also intersecting said cavity, said cartridge comprising:
 a. a body structure fitting said cavity and defining a mixing chamber, inlet openings communicating between said chamber, and said inlet ports, and an outlet opening communicating between said chamber and said outlet port;

b. valve seats for said inlet openings, each valve seat having an axially yieldable peripheral portion responsive to fluid pressure at said inlet port to urge said valve seat toward said mixing chamber;
c. a pair of diaphragm elements opposite said valve seats;
d. and a pair of valve elements within said mixing chamber including heads engageable with said valve seats and stems sealed in said diaphragms and extending into said bores for operation by said control.

9. A replaceable valve cartridge, as defined in claim 8, which is adapted to be received in a mixing valve having a central securing means and wherein:
a. said body structure is provided with a central tube isolated from said mixing chamber and receives said securing means.

10. A replaceable valve cartridge, as defined in claim 9, wherein:
a. the axes of said valve elements are located in planes passing through the axis of said tube and are relatively displaced approximately 120°.

11. A replaceable valve cartridge, as defined in claim 8, which is adapted to be received in a mixing valve having two outlet ports intersecting said cavity wherein:
a. said body structure defines outlet openings communicating with said outlet ports;
b. and a diverter valve is interposed between said outlet openings.

12. A replaceable valve cartridge, as defined in claim 8, wherein:
a. said body structure is in the form of a hollow disc;
b. and seal discs cover the axial ends of the body structure, said seal discs being integral with said valve seats and said diaphragm elements respectively.

13. A replaceable valve cartridge, as defined in claim 8, wherein:
a. each of said valve seats includes a radial rib whereby, in the region of the rib, the valve seat is less yieldable.

14. A replaceable mixing valve cartridge, comprising:
a. a first disc means having a pair of inlet apertures;
b. a second disc means having a pair of diaphragm apertures;
c. said disc means disposed in coaxial relation and defining therebetween a mixing chamber having an outlet;
d. a valve gasket carried by said first disc means and including a pair of valve seats framed by said inlet apertures;
e. a diaphragm gasket carried by said second disc means and including a pair of diaphragms extending into said diaphragm openings;
f. and a pair of valves, including valve faces engageable with said valve seats, and valve stems extending through and sealed by said diaphragms.

15. A replaceable mixing valve cartridge, as defined in claim 14, wherein:
a. at least said valve gasket overlies an end of said cartridge to form a seal on installation in a mixing valve.

16. A replaceable mixing valve cartridge, as defined in claim 14, wherein:
a. both of said gaskets overlie the distal sides of said disc means to form seals on installation in a mixing valve.

17. A replaceable mixing valve cartridge, as defined in claim 14, wherein:
a. said mixing chamber outlet is directed radially;
b. and seal means surrounds said disc means at axially opposite sides of said outlet to define in part a second mixing chamber.

18. A replaceable mixing valve cartridge, as defined in claim 14, wherein:
a. said disc means includes guides for said valves;
b. and said second disc means includes a pair of disc members which clamp said diaphragm gasket.

19. A replaceable mixing valve cartridge, as defined in claim 14, wherein:
a. said first disc means includes a pair of said disc members forming inlet chambers terminating at said inlet openings and forming shoulders bordering said openings;
b. and said valve gasket includes liners for said inlet chambers having shoulders bordering said valve seats for exposure to upstream pressure.

20. A replaceable mixing valve cartridge, as defined in claim 14, wherein:
a. said disc means define a central bore and a tubular securing means extends through said bore and clamps said disc means and forms a bolt guide.

21. A replaceable mixing valve cartridge, as defined in claim 14, wherein:
a. said mixing chamber is intersected by a pair of opposed outlets;
b. and a diverter valve traverses said mixing chamber and extends into said outlets.